United States Patent

Deisch

[15] 3,696,253

[45] Oct. 3, 1972

[54] PEAK-TO-PEAK ALTERNATING CURRENT SIGNAL DETECTOR

[72] Inventor: Cecil Winston Deisch, Wheaton, Ill.

[73] Assignee: Bell Telephone Laboratories, Incorporated, Murray Hill, Berkeley Heights, N.J.

[22] Filed: June 7, 1971

[21] Appl. No.: 150,346

[52] U.S. Cl. ....................307/235, 307/229, 321/15, 328/115, 328/118, 328/142

[51] Int. Cl. ..............................................H03k 5/20

[58] Field of Search.....321/15; 307/235, 235 A, 227, 307/229, 110; 328/115, 118, 171, 142–145

[56] References Cited

UNITED STATES PATENTS

| | | | |
|---|---|---|---|
| 3,478,258 | 11/1969 | Nagai | 321/15 |
| 3,496,383 | 2/1970 | Tomsa | 307/235 A |
| 3,435,193 | 3/1969 | Aitchison | 307/227 |
| 2,783,413 | 2/1957 | Smith | 321/15 |
| 3,150,271 | 9/1964 | Robertson | 307/227 |
| 3,012,181 | 12/1961 | Schultz | 321/15 |

*Primary Examiner*—Rudolph V. Rolinek
*Assistant Examiner*—David M. Carter
*Attorney*—R. J. Guenther and R. B. Ardis

[57] ABSTRACT

A peak-to-peak alternating current signal detector for reducing the current drain of the input supply and improving the accuracy of the output voltage regulation. The parallel diode rectifier of a conventional half-wave voltage doubler circuit is replaced by a transistor having its emitter-collector circuit connected across the series capacitor of the doubler. Instead of depending upon the quiescent bias of the supply to provide the extensive current demanded to discharge the series capacitor during one of the alternations of the applied signal, the latter capacitor is discharged through the emitter-collector circuit of the transistor.

2 Claims, 2 Drawing Figures

INVENTOR
C. W. DEISCH
BY William H. Kaunitz
ATTORNEY

PEAK-TO-PEAK ALTERNATING CURRENT SIGNAL DETECTOR

BACKGROUND OF THE INVENTION

This invention relates to alternating current detection circuits and, more particularly, to such circuits adapted to generate a direct current output voltage proportional to the peak-to-peak amplitude of an alternating voltage input.

Detection circuits, such as voltage doublers, for example, comprising a rectifying network associated with the output stage of an amplifier circuit are well known in the art as are their maximum output current limitations. These limitations become critical when the demand for a maximum output level is coupled with the maintenance of strict voltage regulation. Manifestly, the output current range may be maximized by obtaining the lowest ratio of output impedance of the driving source to the input impedance of the load terminating the rectifying network. This ratio may be realized in two ways: The output impedance of the driving source may be lowered or the network may be terminated in a greatly reduced load and the output signal thereacross then amplified. In the first case, however, if the source is a transistor output stage of an amplifier, more bias current must be supplied with a resulting increase in power dissipation. In the latter case, the increased cost of the additional amplifier stage together with its power requirements leaves this solution also less than ideal.

The problem is exemplified in a specific prior art rectifier network in which brief alternating current peaks may frequently be 5 to 10 times the average direct current taken at its output. If, for example, ten milliamperes output is to be made available to the load, alternating peak currents as high as one hundred milliamperes may be required at the input of the network. This in turn means that, depending upon the polarity of the bias of the typical transistor output stage of the driving amplifier, one of the half-cycles of the input current must be entirely supplied by that bias. The latter bias must then be of a magnitude at least as great as the maximum peak swings of the network input current and, to achieve any level of output accuracy, the bias current must be several times higher, say, 250 milliamperes in this example. In this typical case, an output of ten milliamperes of direct current is thus supplied at the high cost of 250 milliamperes direct current drain in the output stage of the amplifier. This power expenditure must of course be paid for in any system incorporating the rectifier network. Where the system comprises portable equipment, for example, the expenditure, in placing undue drain on battery power, also necessitates more frequent battery replacement.

Accordingly, it is an object of this invention to achieve a higher output signal level in a detection network without the attendant cost of higher power dissipation.

It is also an object of this invention to increase the accuracy of regulation of the output voltage of an alternating current rectifying network.

Also an object of this invention is a new and improved alternating current rectifying network for achieving the foregoing objects without substantially increasing circuit complexity or adding to its cost.

SUMMARY OF THE INVENTION

The foregoing and other objects of this invention are realized in one illustrative embodiment thereof in which the discharging path of the series capacitor of a typical rectifying network is diverted from the conducting path of the amplifier output transistor to a transistor bypass circuit within the network itself. More specifically, according to this invention, the shunting diode through which the series capacitor conventionally is discharged during one of the alternating swings of the input current, is replaced by a transistor having its collector-emitter circuit connected across the capacitor.

In the typical prior art rectifying network here contemplated, during the positive swing of the alternating current being supplied to the network, the positive potential source of the amplifier adequately provides the charging current for the capacitor. In the circuit of this invention this condition remains the same. The negative swings of the current, however, are no longer supplied by the quiescent bias current but the capacitor is advantageously restored by discharging through the paralleling transistor. As a result, the bias current of the output stage of the amplifier may now be substantially reduced.

A rectifying network according to this invention thus achieves a substantial reduction in the drain on the power source of the circuit and does so at negligible if any additional cost. Advantageously, a greater degree of accuracy in the regulation of the output voltage is also made possible.

BRIEF DESCRIPTION OF THE DRAWING

The problems to which this invention is directed together with the advantages achieved thereby will be better understood from a consideration of the detailed description of the organization and operation of one illustrative embodiment thereof which follows when taken in conjunction with the accompanying drawing in which.

DETAILED DESCRIPTION

Figure 1:
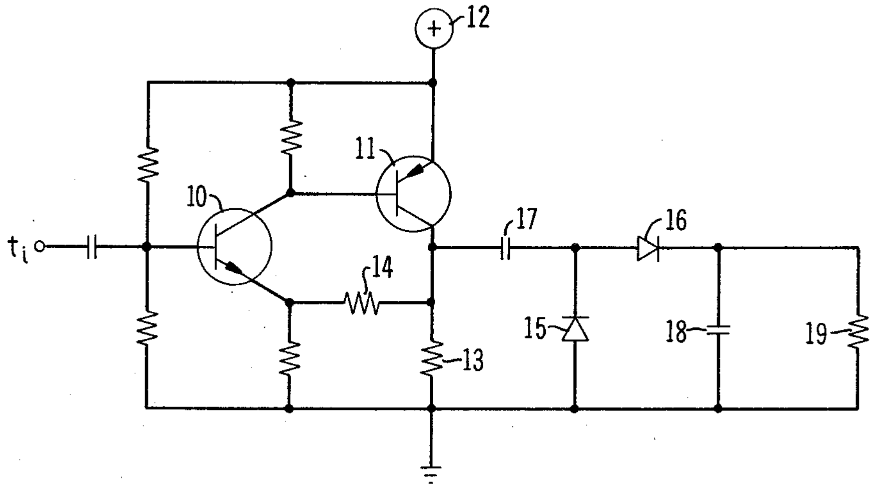
FIG. 1 PRIOR ART
FIG. 1 depicts schematically a typical prior art amplifier-detection network included to demonstrate the problems to which the present invention is directed.

A typical prior art amplifier circuit adapted to supply an alternating voltage to a conventional rectifying network is shown in FIG. 1, the waveform of the voltage being assumed for purposes of description as sine wave. The amplifier conventionally comprises a pair of opposite conductivity type transistors 10 and 11, the latter being connected in the output stage of the circuit, which stage is here of chief concern. Specifically, transistor 11 is connected between a source of positive potential 12 and ground by means of its emitter and collector via a biasing resistor 13. Feedback is typically provided from the collector of transistor 11 through a resistance 14 and an input terminal $t_i$ is provided to which alternating current signals to be amplified are applied.

A network comprising a pair of semiconductor diodes 15 and 16 accomplishes the rectification in association with a pair of capacitors 17 and 18 to supply a direct current output to a load 19. The network is connected to the collector of transistor 11 via capacitor 17 which in turn is serially connected with diode 16 and the load 19. Diode 15 and capacitor 18 are connected across the load 19, the outputs of the diodes being interconnected in series with the load 19 in a manner which will be recognized as providing a half-wave voltage doubler circuit. The output appearing across parallel capacitor 18 and applied to load 19 is referenced, in this circuit, to ground and is proportional to the peak-to-peak alternating voltage signal output of the amplifier if the output stage and the bias of the amplifier are properly designed. During a positive alternation of a signal applied to the network, capacitors 17 and 18 are charged via a path including the diode 16 and during a following negative alternation, the capacitor 17 is charged in the opposite polarity via a path including diode 15. Because the diodes 15 and 16 are forward biased only near the peaks of the alternating current signal, current flows through capacitor 17 only for brief intervals near the positive and negative peaks of the input signal waveform. As a result, these brief current pulses through capacitor 17 may easily rise to 5 to 10 times the magnitude of the average direct current output applied across the load 19, depending upon particular circuit element values.

The positive alternations of the input signal which are transmitted through diode 16 to charge capacitor 18 are readily supplied by the transistor 11 output stage because it is directly connected to the positive potential source 12. The negative alternations, however, which charge capacitor 17 in the opposite direction through diode 15, can only be supplied by the quiescent bias current appearing in the output stage of the amplifier. Accordingly, the bias current must be at least as great as the maximum current peaks through capacitor 17. To achieve any degree of accuracy in the regulation of the direct current output, the bias current should be several times higher. The output stage of the amplifier must thus drain the latter bias current level simply to provide a relatively low output current level.

Figure 2:
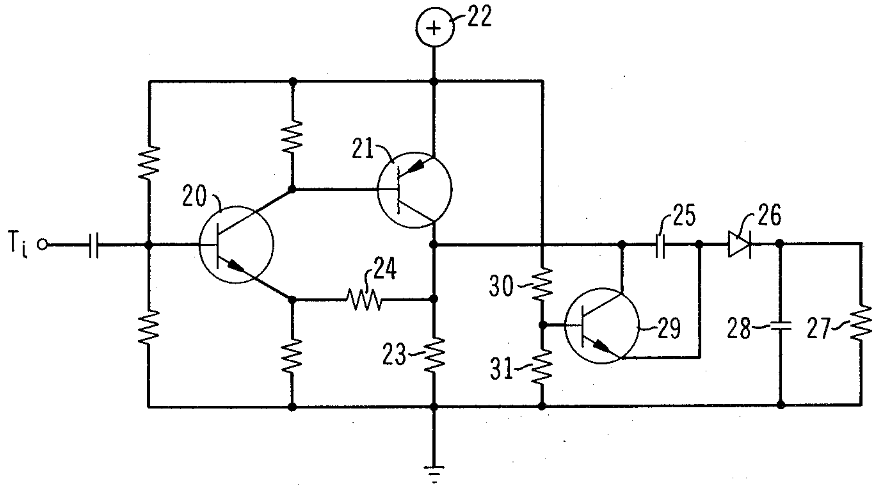
FIG. 2 depicts schematically one illustrative alternating current detection network according to the principles of this invention.

An illustrative detection circuit according to the principles of this invention is shown in FIG. 2 and may conveniently be supplied with alternating voltage signals by means of an amplifier identical to that assumed in connection with the prior art arrangement of FIG. 1. This amplifier may thus comprise a pair of opposite conductivity type transistors 20 and 21, the latter being connected between a source of positive potential 22 and ground via a biasing resistance 23 and its emitter-collector circuit. Feedback is again taken from the collector of transistor 21 via a resistance 24 and a terminal $T_i$ provides an input for the alternating signals to be amplified. A rectifying network is connected to the collector of the output stage transistor 21 and comprises a capacitor 25 serially connected with a semiconductor diode 26 and an output load 27. A second capacitor 28 parallels the load 27 and is charged during the positive alternations of the signal applied by the amplifier stage. An NPN transistor 29 having its emitter-collector circuit connected across the capacitor 25, according to this invention, provides the means for discharging the latter in a manner to be considered hereinafter. The base of transistor 29 is connected for bias purposes to an output tap of a voltage divider connected between the source of potential 22 and ground, the divider comprising a pair of resistances 30 and 31.

During a positive alternation of a signal applied to the network, capacitors 25 and 28 are charged via a path including diode 26 in a manner identical to that described for the corresponding elements of the prior art circuit of FIG. 1. The positive-going current which is transmitted through diode 26 to charge capacitor 28 is again readily supplied by the transistor 21 output stage because it is directly connected to the positive potential source 22. During the negative-going alternation of the input signal, the current is no longer supplied by the bias of the output stage, however, but instead, capacitor 25 is discharged through transistor 29. The negative peak voltage on capacitor 25 at this time is of a magnitude such that the emitter of transistor 29 attempts to drop below the bias of its base. As a result, transistor 29 conducts and discharges capacitor 25 with practically no current drain from the bias of the output stage of the amplifier. Manifestly, transistor 29 could have been biased at ground; however, the junction voltage drops of diode 26 and the base-emitter of transistor 29 are advantageously reduced or even eliminated by applying a positive bias to the base by means of the voltage divider circuit. In one alternate arrangement, the resistance 31 of the latter divider may be replaced by one or more diodes supplying an equivalent voltage drop. A base bias thus provided is insensitive to the positive potential source and advantageously compensates for the effects of any temperature changes which transistor 29 and diode 26 may undergo.

The novel circuit thus described simply and economically makes possible a greatly reduced power drain on the potential source 22 and at the same time achieves a more accurate regulation of the output voltage generated across the load 27. It will be understood that what has been described is considered to be only one specific illustrative embodiment of this invention and various and numerous other arrangements may be devised by one skilled in the art without departing from the spirit and scope of this invention as defined by the accompanying claims.

What is claimed is:

1. An electrical circuit for supplying a direct current output responsive to an alternating current input comprising
   - a rectifying network comprising a series circuit including
   - a first capacitor,
   - a diode, and
   - a second capacitor,
   - amplifier means for providing a positive current alternation to said network responsive to a corresponding positive alternation of said input comprising
     - a first transistor,
     - a source of potential connected in the emitter-collector circuit of said first transistor and
     - means for applying a predetermined bias to said first transistor, said first and second capacitor being charged during said positive alternation on said network along a path including said series circuit and said emitter-collector circuit, said bias being determined as of a magnitude less than required for the generation by said amplifier means of current to discharge said first capacitor responsive to a negative alternation of said input, means for providing a negative current alternation to said network comprising a second transistor having its emitter-collector circuit connected across only said first capacitor for discharging only said last-mentioned capacitor and only by current conducted in said emitter-collector circuit of said second transistor, and output terminal means connected to said series circuit at the output of said diode.

2. An electrical circuit as claimed in claim 1 also comprising means for biasing said second transistor comprising a voltage divider having an output tap connected to the base of said second transistor.

* * * * *